Feb. 21, 1956     X. B. K. GREEN ET AL     2,735,468
DETACHABLY-MOUNTED DISC BLADE FOR FOOD SLICING MACHINES
Filed June 18, 1953
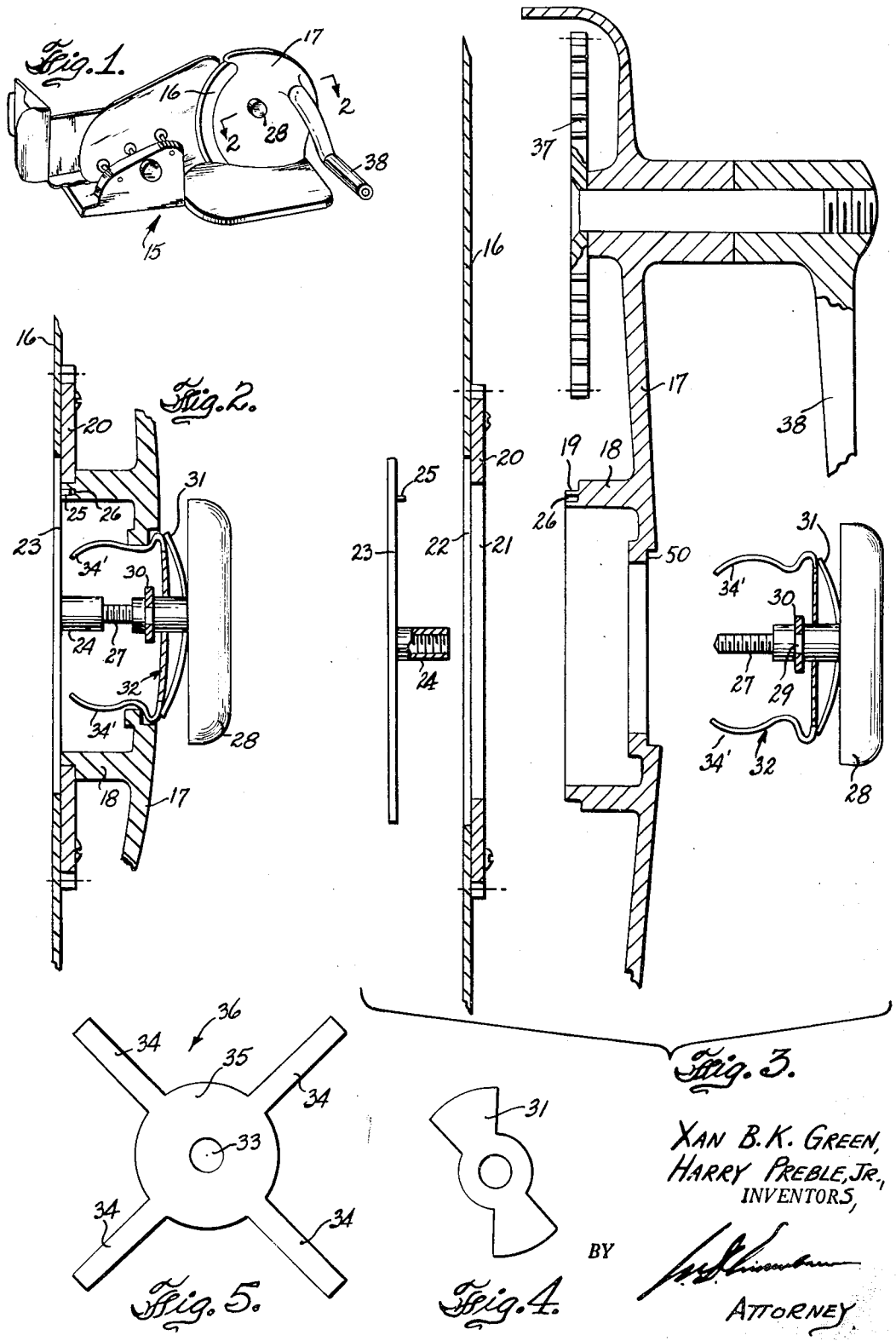
Xan B. K. Green,
Harry Preble, Jr.,
INVENTORS,
BY
Attorney

United States Patent Office 2,735,468
Patented Feb. 21, 1956

2,735,468

DETACHABLY-MOUNTED DISC BLADE FOR FOOD SLICING MACHINES

Xan B. K. Green, New Paltz, and Harry Preble, Jr., Cross River, N. Y., assignors to General Slicing Machine Co., Inc., Walden N. Y., a corporation of New York Application June 18, 1953, Serial No. 362,552

7 Claims. (Cl. 146—102)

The present invention relates to food slicing machines of the type employing a rotatable disc blade and more particularly to a construction affording blade removal, remounting and adjustment.

An object of this invention is to provide a novel and improved slicing machine of the character mentioned, whose blade is easily removable for cleaning purposes, it just as easily replaced back again and adjustment can be made so that the blade runs with a certain degree of tightness, a condition commonly called "tensioning" the blade.

A further object hereof is to provide a food slicing machine of the character mentioned, of novel and improved construction, which for accomplishment of easy blade removal, remounting and adjustment, utilizes simple structure, easy to manipulate, reasonably cheap to make and efficient in carrying out the purposes for which it is designed.

Other objects and advantages will become apparent as this disclosure proceeds.

In the accompanying drawings forming part of this specification, similar characters of reference indicate corresponding parts in all the views.

Fig. 1 is a perspective view of a food slicing machine embodying the teachings of this invention.

Fig. 2 is a fragmentary sectional view taken at lines 2—2 in Fig. 1. The crank handle and the gear it carries are omitted here and the blade housing is shown incomplete.

Fig. 3 is a similar view shown "exploded." However here, the parts not shown in Fig. 2 are included and the blade housing is shown complete.

Fig. 4 is a top plan view of one of the spring components included in this embodiment.

Fig. 5 shows the blank of which another of the spring components may be made.

In the drawings, the numeral 15 designates generally a food slicing machine which may be of any type having a rotatable disc blade 16 as its cutting member. In the embodiment illustrated, the machine's frame includes a housing member 17 which provides the mount for said blade and shields practically all of one face thereof except that portion of the blade's periphery which is called upon at any instance to do the actual cutting. The other face of the blade 16, is here shown unshielded as is usual in many machines of this type.

The blade supporting side of the housing member 17 is provided with a ring boss 18 extending laterally therefrom. The free end of this boss is of reduced diameter as shown at 19, to serve as the actual bearing surface for the ring gear 20 carried concentrically fixed on the disc blade 16. The said reduced end 19 of said boss, fits into the central circular hole 21 of the gear 20 so that said gear which carries the blade, is free for rotation on 19. The width of gear 20 is preferably made slightly greater than the width of the bearing surface afforded by the cylindrical surface 19.

The central circular hole 22 in the disc blade 16, is of larger diameter than the hole 21 of the gear 20. The numeral 23 denotes a disc which has a nut 24 coaxially fixed thereon and extending from one surface thereof. Also from this surface, said disc 23 has a pin 25 extending laterally therefrom to be received in the socket hole 26 in the face of the boss 18 as in Fig. 2. The diameter of the disc 23 is larger than that of the hole 21 of the gear 20, and slightly smaller than the diameter of the hole 22 in the disc blade 16.

The numeral 27 indicates a screw adapted for threaded engagement with the nut 24. This screw has a knob 28 for its head while the shank thereof is provided with an annular groove 29 in which a split spring washer 30 is received to hold the bowed blade spring member 31 and the pronged spring member 32 on said shank. In this assembly, the blade spring 31 is intermediate the knob 28 and the pronged spring member 32. Said bowed blade spring 31 is the equivalent of a compression coil spring. The spring member 32 may be made of the blank shown in Fig. 5, which is really a washer having the central hole 33 and the equi-spaced radially extending fingers 34. These fingers are each bent to form a spring prong 34' extending from one surface of the washer portion 35 of the blank 36. These prongs are so formed as shown, so that spring member 32 may be snapped in in detachable set position on the housing member 17 whereby the screw 27 shall extend into the central hollow of the boss 18. Note the countersinking to provide the seat 50 for the spring finger carrying member 32. This mentioned feature of detachability here is not mandatory, but is avisable to be, so that if the bowed blade spring 31 shall become spent, it may be easily replaced. Essentially this construction affords that the screw 27 be journalled on the housing member 17 and have some longitudinal movement to gain the function which the spring 31 is here to accomplish, as will be explained.

Consider the machine in assembled use condition where the mentioned components are associated as shown in Fig. 2. Now, should it be desired to remove the blade 16 for cleaning, all that is necessary to do is to turn the knob 28 until screw 27 becomes disengaged from the nut 24. The disc 23 carrying such nut, and the blade 16 carrying the gear 20, are free for removal.

After the blade is cleaned, it is again set so that its gear 20 is on the bearing surface 19 and in engagement with the driver gear 37 which is operated by motive power or by means of the crank handle 38. The disc 23 is set into the blade's hole 22 so that the screw 27 can again engage the nut 24 carried on such retaining disc 23. Knob 28 is turned to effect such screw and nut engagement and to stress the spring 31 to such an extent that the blade 16 runs with a desired degree of tightness caused by the pressing action of the disc 23 on the gear 20 against the shoulder 19'; such pressure, of course, being adjustable, as is evident.

This invention is capable of numerous forms and various applications without departing from the essential features herein disclosed. It is therefore intended and desired that the embodiment shown herein be deemed illustrative and not restrictive; reference being had to the following claims rather than to the specific description herein to indicate the scope of this invention.

We claim:

1. In a slicing machine of the character described, a disc slicing blade having a central hole, a gear coaxially secured on one surface of the blade having a central circular hole smaller than the hole in the blade, a frame piece having opposite surfaces, a ring boss extending from one surface thereof; the free end portion of said boss being of reduced diameter and such free end having a flat face; said gear being removably rotatably mounted on said reduced portion; said frame member having a hole therethrough centrally of and communicative with the interior of said boss; the hole in the blade being larger than the hole at the reduced end of said boss, a plate loosely positioned within the hole in the blade, coplanar with said blade and in contact with the face of the ring boss, disengageable cooperating means on said plate and boss to maintain said plate against axial rotary movement; said plate overlapping the hole of the gear; a shank having a head, a member rotatably carried on the shank; said member having a plurality of resilient fingers extending away from said head, means on said shank to maintain said member thereon; said frame piece being positioned between the gear and said spring finger carrying member and in contact with said member; said fingers being positioned through the hole in the frame piece and into the ring boss in spaced relation with said plate; said fingers releasably engaging said frame piece within said hole, and disengageable means on said plate and shank in threaded engagement positioned within the boss; the adjacent faces of the gear and plate being in sliding contact; said knob being turnable to free the plate and knife for removal from the frame piece while said spring fingers maintain said knob and its shank associated with the frame piece, during such turning and after removal of said plate and knife from the frame piece.

2. The structure as defined in claim 1, wherein the threaded engagement means is adjustable whereby the plate exerts a desired pressure on the gear.

3. The structure as defined in claim 1, including compression spring means positioned between the head on the shank and the frame piece, acting to pull the plate against the gear where they are in contact.

4. The structure as defined in claim 1, wherein the hole through the frame piece is countersunk to afford a seat for the resilient-finger carrying member; said member being positioned on such seat.

5. The structure as defined in claim 1, wherein the plate and the hole in the blade are circular; said plate serving as a supporting shaft for said blade.

6. The structure as defined in claim 1, wherein the head on the shank is a hand knob.

7. In a slicing machine of the character described, a disc slicing blade having a central hole, a gear coaxially secured on one surface of the blade having a central circular hole smaller than the hole in the blade, a frame piece having opposite surfaces, a ring boss extending from one surface thereof; the free end portion of said boss being of reduced diameter and such free end having a flat face; said gear being removably rotatably mounted on said reduced portion; said frame member having a hole therethrough centrally of and communicative with the interior of said boss; the hole in the blade being larger than the hole at the reduced end of said boss, a plate loosely positioned within the hole in the blade, coplanar with said blade and in contact with the face of the ring boss, disengageable cooperating means on said plate and boss to maintain said plate against axial rotary movement; said plate overlapping the hole of the gear; a shank having a head; said shank being positioned through the hole in the frame piece whereby its head is at the other surface of the frame piece, means on said plate and shank in threaded engagement within said boss, and a compression spring carried on the shank between the head on the shank and the frame piece, acting to pull the plate against the gear where they are in contact.

References Cited in the file of this patent

UNITED STATES PATENTS 2,505,921    Sporket _____ May 2, 1950